United States Patent
Yoshida

(10) Patent No.: US 12,289,076 B2
(45) Date of Patent: Apr. 29, 2025

(54) METHOD OF CONTROLLING POWER GENERATION APPARATUS AND PUMPED STORAGE POWER GENERATION APPARATUS

(71) Applicant: HITACHI MITSUBISHI HYDRO CORPORATION, Tokyo (JP)

(72) Inventor: Masahiro Yoshida, Tokyo (JP)

(73) Assignee: HITACHI MITSUBISHI HYDRO CORPORATION, Tokyo (JP)

( * ) Notice: Subject to any disclaimer, the term of this patent is extended or adjusted under 35 U.S.C. 154(b) by 0 days.

(21) Appl. No.: 18/024,467

(22) PCT Filed: Sep. 11, 2020

(86) PCT No.: PCT/JP2020/034601
§ 371 (c)(1),
(2) Date: Mar. 2, 2023

(87) PCT Pub. No.: WO2022/054260
PCT Pub. Date: Mar. 17, 2022

(65) Prior Publication Data
US 2023/0327589 A1    Oct. 12, 2023

(51) Int. Cl.
*H02P 9/10*    (2006.01)
*F03B 1/00*    (2006.01)
*H02P 101/10*    (2015.01)

(52) U.S. Cl.
CPC ............. *H02P 9/107* (2013.01); *F03B 1/00* (2013.01); *F05B 2220/706* (2013.01); *F05B 2270/1033* (2013.01); *H02P 2101/10* (2015.01)

(58) Field of Classification Search
CPC ............. H02P 9/107; H02P 2101/10
See application file for complete search history.

(56) References Cited

U.S. PATENT DOCUMENTS 1,813,107 A * 7/1931 Allner ................. H02K 7/1823
                                                416/168 A
3,886,373 A * 5/1975 Okada ..................... F03B 15/06
                                                290/1 R
(Continued)

FOREIGN PATENT DOCUMENTS

JP        S64-45995 A      2/1989
JP        2001-41142 A     2/2001
(Continued)

OTHER PUBLICATIONS

International Search Report issued in corresponding International Patent Application No. PCT/JP2020/034601, filed Nov. 10, 2020, with English translation.
(Continued)

*Primary Examiner* — Tulsidas C Patel
*Assistant Examiner* — Thomas K Quigley
(74) *Attorney, Agent, or Firm* — Rimon P.C.

(57) ABSTRACT

A method of controlling a power generation apparatus and a pumped storage power generation apparatus including a motor directly connected to a rotor of a generator or generator motor, the method performing speed control by providing a guide vane opening degree command to the motor, the guide vane opening degree command being calculated by a rotational speed controller including a proportional control element, an integral control element, and a differential control element, in which a first upper limit limiting function is multiplied by a second upper limit limiting function, the first upper limit limiting function being included in an output runaway prevention circuit of an integral control function provided in the integral control element and being defined according to an output signal of a load limiter.

3 Claims, 10 Drawing Sheets

(56) References Cited

U.S. PATENT DOCUMENTS

| | | | | |
|---|---|---|---|---|
| 3,960,463 | A * | 6/1976 | Okada | F04D 29/466 415/910 |
| 4,109,160 | A * | 8/1978 | Goto | F03B 13/06 415/17 |
| 4,267,459 | A * | 5/1981 | Yokoyama | F03B 15/005 290/52 |
| 4,344,027 | A | 8/1982 | Karlicek | |
| 4,472,105 | A * | 9/1984 | Takiguchi | F03B 15/005 415/24 |
| 4,652,807 | A * | 3/1987 | Nagura | H02P 1/26 318/778 |
| 4,742,288 | A * | 5/1988 | Sugimoto | H02P 9/10 318/818 |
| 4,743,827 | A * | 5/1988 | Shiozaki | H02J 15/003 318/798 |
| 4,812,730 | A * | 3/1989 | Nakagawa | H02P 9/42 318/705 |
| 4,816,696 | A * | 3/1989 | Sakayori | F03B 15/06 322/14 |
| 4,952,852 | A * | 8/1990 | Bando | H02H 7/06 318/434 |
| 5,148,093 | A * | 9/1992 | Bando | H02P 29/025 318/779 |
| 5,160,244 | A * | 11/1992 | Kuwabara | F04D 15/0066 417/27 |
| 5,729,118 | A * | 3/1998 | Yanagisawa | H02P 23/08 322/29 |
| 10,326,393 | B2 | 6/2019 | Yoshida | |
| 2018/0375452 | A1 | 12/2018 | Yoshida | |
| 2023/0123425 | A1* | 4/2023 | Obermeyer | F04D 1/04 |
| 2024/0093665 | A1* | 3/2024 | Obermeyer | F04D 29/2255 |

FOREIGN PATENT DOCUMENTS

| | | |
|---|---|---|
| JP | 2012-16242 A | 1/2012 |
| JP | 2015-171157 A | 9/2015 |
| JP | 6446569 B2 | 12/2018 |
| WO | 2017/109921 A1 | 6/2017 |

OTHER PUBLICATIONS

Extended European Search Report issued in the corresponding European patent Application No. 20953325.6 dated May 13, 2024.

* cited by examiner

METHOD OF CONTROLLING POWER GENERATION APPARATUS AND PUMPED STORAGE POWER GENERATION APPARATUS

CROSS-REFERENCE OF RELATED APPLICATIONS

This application is the U.S. National Phase under 35 U.S.C. § 371 of International Patent Application No. PCT/JP2020/034601, filed on Sep. 11, 2020, the entire disclosure of which Application is incorporated by reference herein.

FIELD

The present invention relates to a method of controlling a power generation apparatus and a pumped storage power generation apparatus. In particular, the present invention relates to a method of controlling a power generation apparatus and a pumped storage power generation apparatus, in which a rotational speed controller including a proportional control element, an integral control element, and a differential control element and in which the integral control element internally holds a guide vane opening degree command value corresponding to a load output calculates a guide vane opening degree command based on a difference between a rotational speed corresponding to a frequency of a commercial power system and a rotor rotational speed in a power generation operation, gives the guide vane opening degree command to a turbine in the power generation apparatus, and gives the guide vane opening degree command to a pump turbine side in the pumped storage power generation apparatus to perform speed control.

BACKGROUND

In the power generation operation of the power generation apparatus and a pumped storage power generation apparatus, a rotational speed controller receives a value obtained by dividing the difference between the rotational speed corresponding to the frequency of the commercial power system and the rotor rotational speed by the rated rotational speed to control the guide vane opening degree and control the rotational speed and the load output by controlling the guide vane opening degree using the sum of the outputs the control elements of the proportional control element, the integral control element, and the differential control element provided in the rotational speed controller. The guide vane opening degree command value corresponding to the load output is held in the integral control element. At the time of load breaking, parallelization is off by the breaker and the generator output is lost, so that the rotor rotational speed rapidly increases, the input to the rotational speed controller becomes negative and the command value making the guide vane opening degree rapidly changes to closing is output, and the guide vane opening degree decreases at the guide vane closing rate set in the guide vane operation mechanism. The guide vane opening degree command value held in the integral control element also gradually decreases.

However, in a power generation apparatus and a pumped storage power generation apparatus connected to the long conduit, it is necessary to set the gain of each control element provided in the rotational speed controller to be small in order to prevent the water pressure fluctuation of the conduit from becoming excessive. In addition, in the power generation apparatus and the pumped storage power generation apparatus that perform the generator voltage building-up operation in response to the blackout of the power system, it is necessary to set the gain of each control element provided in the rotational speed controller to be small in order to make the change in power supply to the system after the blackout gentle and smooth. In the state where parallelization is off by the breaker at the time of occurrence of load breaking, the gain setting of, in particular, the integral control element becomes small, that is, the set time constant of the integral control element becomes long, so that the decrease, due to the increase in the rotational speed, of the guide vane opening degree command value held in the integral control element becomes slow. Therefore, the guide vane opening degree decreases and the rotational speed indicates the maximum value, and then the speed starts to decrease, and when the speed becomes close to the rated rotational speed so that the guide vane opening degree closing command from the proportional control element becomes small and close to zero, a phenomenon in which the guide vane opening degree command value from the rotational speed controller according to the guide vane opening degree command value held in the integral control element exceeds the guide vane opening degree occurs, and then a phenomenon in which the guide vane opening degree excessively increases again occurs.

Therefore, it is not possible to set a small control gain of each control element in the rotational speed controller of the power generation apparatus and the pumped storage power generation apparatus connected to the long conduit, and the power generation apparatus and the pumped storage power generation apparatus that performs the generator voltage building-up operation in response to the blackout of the power system. Thus, it is necessary to increase the gain setting of, in particular, the integral control element to a level that allows prevention of occurrence of the phenomenon in which the guide vane opening degree increases again during closing the guide vane when the load breaking occurs.

For example, Patent Literature 1 discloses a method capable of preventing occurrence of a phenomenon in which in a state where parallelization is off by the breaker at the time of occurrence of the load breaking, the guide vane opening degree decreases, after the rotational speed indicates the maximum value, the speed starts to decrease to become close to the rated rotational speed, and the guide vane opening degree increases again. In the variable-speed pumped storage power generation apparatus described in Patent Literature 1, a turbine characteristic function generator receives a power generation output command provided and a water level detection signal from the outside, and outputs an optimum rotational speed command and an optimum guide vane opening degree, and the optimum guide vane opening degree command value is added to an output of a rotational speed controller. However, since the guide vane opening degree command value corresponding to the power generation output command is not held in the rotational speed controller, the above phenomenon does not occur. That is, the variable speed pumped storage power generation apparatus described in Patent Literature 1 does not achieve the object assumed by the present invention.

FIG. 7 illustrates a configuration example related to a power generation operation of a conventional constant-speed based power generation apparatus or pumped storage power generation apparatus. Reference sign 1 denotes a generator or generator motor that is rotationally driven up to a rotational speed corresponding to the frequency of the commercial power system by a motor 2 directly connected to the rotor of the generator or generator motor, and the AC power is output to the commercial power system via a breaker 3. The motor 2 may be a turbine when the power generation apparatus is a control target apparatus, and may be a pump turbine when the pumped storage power generation apparatus is a control target apparatus.

Reference sign 4 denotes a rotational speed detector of the rotor that outputs a signal in a range of 0.0 $N_o$ to 1.15 $N_o$ as a rotational speed detector output signal 5. Reference sign 6 denotes a rotational speed signal (65 F output signal, target rotational speed signal) corresponding to the frequency of the commercial power system. Reference sign 7 denotes a subtractor that subtracts the rotational speed detector output signal 5 from the rotational speed signal 6 corresponding to the frequency of the commercial power system and outputs the result.

Reference sign 8 denotes a gain multiplier that multiplies the output signal of the subtractor 7 by the reciprocal $1/N_o$ of the rated rotational speed $N_o$ and outputs the result. Reference sign 10 denotes a subtractor that subtracts an output signal of a gain multiplier 29 to be described below from an output signal of the gain multiplier 8 and outputs the result. Reference sign 12 denotes a rotational speed controller that includes a proportional control element, an integral control element, and a differential control element to be described below. The output signal of the subtractor 10 is input to the rotational speed controller 12. Reference sign 13 denotes a proportional control function that is a proportional control element of the rotational speed controller 12. The proportional control function 13 receives the output signal of the subtractor 10, multiplies the received output signal by a gain $K_{PN}$, and outputs the result.

The integral control element of the rotational speed controller 12 includes a subtractor 14 to a subtractor 17. The subtractor 14 subtracts an output signal of the subtractor 17 to be described below from the output signal of the subtractor 10 and outputs the result. Reference sign 15 denotes an integral control function that receives the output signal of the subtractor 14, multiplies the received output signal by a gain $K_{IN}$, integrates the result, and then outputs the result. Reference sign 16 denotes an output runaway prevention circuit of an integral control function of a conventional rotational speed controller. The output runaway prevention circuit 16 receives an output signal of the integral control function 15 and outputs a processing result illustrated in FIG. 8 to be described below. Reference sign 17 denotes a subtractor that subtracts the output signal of the output runaway prevention circuit 16 from the output signal of the integral control function 15, outputs the result, and inputs the result to the subtractor 14.

In the integral control function 15, the guide vane opening degree command corresponding to the power generation output in the power generation operation of the power generation apparatus or pumped storage power generation apparatus is held. At the time of transient change of the rotational speed or the output command, the output signal of the subtractor 10 is integrated and the held value is sequentially updated.

The differential control element of the rotational speed controller 12 includes an imperfect differential control function 18. The imperfect differential control function 18 receives the output signal of the subtractor 10, multiplies the received output signal by a gain $K_{DN}$, and outputs the result of the imperfect differentiation with a time constant of 0.1 seconds.

Reference sign 19 denotes an adder that adds the output signals of the proportional control element, the integral control element, and the differential control element, and outputs the result as an output signal of the rotational speed controller 12.

Reference sign 20 denotes a minimum value selection function that compares an output signal of the rotational speed controller 12 with an output signal of a load limiter 21 to be described below in detail with reference to FIG. 9 to select and output the minimum value. Reference sign 22 denotes a subtractor that subtracts an output signal of an integrator 25 to be described below from the output signal of the minimum value selection function 20 and outputs the result. Reference sign 23 denotes an amplifier that amplifies the output signal of the subtractor 22 and outputs the result. Reference sign 24 denotes an actuator that outputs a guide vane opening degree operation difference signal based on a difference between the output signal of the amplifier 23 and the output signal of the integrator 25 to be described below.

Reference sign 25 denotes an integrator that receives the guide vane opening degree operation difference signal output from the actuator 24, integrates the received signal, and outputs a p.u. based guide vane opening degree signal. Reference sign 26 denotes a guide vane operation mechanism that receives the guide vane opening degree signal output from the integrator 25, and operates the guide vane provided in the motor 2, which is a turbine or a pump turbine to adjust the opening degree so as to adjust an output 27 of the generator or generator motor 1.

Reference sign 28 denotes a subtractor that subtracts an output command 65P for adjusting the output 27 of the generator or generator motor 1 from the guide vane opening degree signal output from the integrator 25 and outputs the result. Reference sign 29 denotes a gain multiplier that outputs, to the subtractor 10, a value obtained by multiplying the output signal of the subtractor 28 by a speed droop σ as a gain.

FIG. 8 is a configuration diagram of the output runaway prevention circuit 16 illustrated in FIG. 7, that is, the output runaway prevention circuit 16 of the integral control function 15 in the conventional rotational speed controller 12 illustrated in FIG. 7.

Reference sign 30 denotes an upper limit limiting function of the output runaway prevention circuit 16. The upper limit limiting function 30 receives the output signal of the load limiter 21 to be described below, adds 0.01 p.u. to the output value of the load limiter 21, and outputs the result while limiting the maximum value to 1.0 p.u. Reference sign 31 denotes a minimum value selection function. The minimum value selection function 31 compares the output signal of the upper limit limiting function 30 of the output runaway prevention circuit 16 with the output signal of the integral control function 15 to select and output the minimum value.

Reference sign 32 denotes a lower limit limiting function of the output runaway prevention circuit 16. The lower limit limiting function 32 receives an output signal of the load limiter 21 to be described below and outputs a constant value −0.01 p.u. Reference sign 33 denotes a maximum value selection function. The maximum value selection function 33 compares the output signal of the lower limit limiting function 32 of the output runaway prevention circuit 16 with the output signal of the integral control function 15 to select and output the maximum value.

Reference sign 34 denotes a maximum value selection function. The maximum value selection function 34 compares the output signal of the minimum value selection function 31 with the output signal of the maximum value selection function 33 to select the maximum value, and outputs the result as the output signal of the output runaway prevention circuit 16.

FIG. 9 is a configuration diagram in an example in which the output of the load limiter 21 is increased from full opening or middle opening of the inlet valve of the load limiter 21 illustrated in FIG. 7.

Reference sign 40 denotes a no-load opening degree and start opening degree setting function. The no-load opening degree and start opening degree setting function 40 receives a static head, and outputs a no-load opening degree signal according to the static head and a start opening degree signal obtained by adding a constant value to the no-load opening degree.

Reference sign 43 denotes a load upper limit opening degree setting function. The load upper limit opening degree setting function 43 receives the static head and outputs a load upper limit opening degree signal according to the static head.

Reference sign 44 denotes a signal switch. The signal switch 44 receives the output signal of the start opening degree setting function 40 and the output signal of the load upper limit opening degree setting function 43, selects and outputs the output signal of the start opening degree setting function 40 when a parallelization signal output from the breaker 3 illustrated in FIG. 7 is OFF, and selects and outputs the output signal of the load upper limit opening degree setting function 43 when the parallelization signal output from the breaker 3 is ON.

Reference sign 35 denotes an AND. The AND 35 receives a start command ON/OFF signal of the power generation apparatus or pumped storage power generation apparatus and an inlet valve full opening or middle opening ON/OFF signal, ANDs the signals, and outputs the result. Reference sign 41 denotes a signal switch. The signal switch 41 receives the constant 0.0 and the constant 1.0, selects and outputs the constant 0.0 when the output signal of the AND 35 is OFF, and selects and outputs the constant 1.0 when the output signal of the AND 35 is ON. Reference sign 36 denotes a subtractor. The subtractor 36 subtracts an output value of a feedback signal generation function 39 to be described below from the output value of the signal switch 41 and outputs the result.

Reference sign 37 denotes an integrator. The integrator 37 receives the output signal of the subtractor 36 and multiplies a reciprocal (1/T) of the change time T from 0% to 100% of the output signal of the load limiter 21 as a gain, and integrates the result, and outputs the result as the output signal of the load limiter 21.

Reference sign 38 denotes a subtractor. The subtractor 38 subtracts the output value of the signal switch 44 from the output value of the integrator 37 and outputs the result. Reference sign 39 denotes a feedback signal generation function. The feedback signal generation function 39 receives the output signal of the subtractor 38, outputs 0.0 when the received signal is less than 0.0 and outputs a value obtained by adding 1.0 to the received signal when the input signal is 0.0 or more, and inputs the value to the subtractor 36.

FIG. 10 is a load breaking actual measurement chart example in the conventional pumped storage power generation apparatus. The vertical axis represents the GV (Guide Vane) servo stroke ratio and the rotational speed, and the horizontal axis represents the elapsed time from the occurrence of load breaking. In this load breaking actual measurement chart example, the control gains of the proportional control function 13, the integral control function 15, and the imperfect differential control function 18 in the rotational speed controller 12 when loaded are set to be low, and in particular, the control gain of the integral control function 15 is low. Due to the low control gains, the decreased amount of the guide vane opening degree command value held in the integral control element is small even when the rotational speed increases after the load breaking. Therefore, in FIG. 10, the rotational speed ($N/N_o$) becomes close to 110% or less after the time when the elapsed time from the occurrence of the load breaking is about 11 seconds, and the low control gains also influence the guide vane opening degree command value, so that the guide vane opening degree closing command decreases due to the proportional control element. Along with the decrease of the guide vane opening degree closing command, the guide vane opening degree command value from the rotational speed controller 12 exceeds the GV servo stroke ratio ($Y/Y_i$) with respect to the initial value $Y_i$. As a result, the GV servo stroke ratio increases again, and the rotational speed ($N/N_o$) also increases again.

FIG. 11 illustrates a load breaking analysis example in the conventional pumped storage power generation apparatus. FIG. 11 illustrates a result obtained by simulating and analyzing the load breaking actual measurement chart example in the conventional pumped storage power generation apparatus illustrated in FIG. 10. The vertical axis represents the GV servo stroke ratio, the output signal value of the rotational speed controller, and the rotational speed. The horizontal axis represents the elapsed time from the occurrence of the load breaking. In FIG. 11, the rotational speed ($N/N_o$) becomes close to 110% or less after the time when the elapsed time from the occurrence of the load breaking is about 10 seconds, and the low control gains also influence the guide vane opening degree command value, so that the guide vane opening degree closing command decreases due to the proportional control element. Along with the decrease of the guide vane opening degree closing command, the output signal from the rotational speed controller 12 exceeds the GV servo stroke ratio ($Y/Y_i$) at the time when the elapsed time from the occurrence of the load breaking is 10 seconds. As a result, similarly to the load breaking actual measurement chart example in the conventional pumped storage power generation apparatus illustrated in FIG. 10, a phenomenon in which the GV servo stroke ratio increases again and the rotational speed ($N/N_o$) also increases again is almost simulated.

In the rotational speed controller 12 applied to the power generation apparatus or pumped storage power generation apparatus configured as described above, it is necessary to set the control gains in the rotational speed controller 12, especially the control gain of the integral control function 15 to be large so that the guide vane opening degree command value held in the integral control function 15 when the rotational speed ($N/N_o$) becomes close to, after reaching the maximum rotational speed after occurrence of the load breaking, 110% or less does not greatly exceed the guide vane opening degree at that time so as to prevent the phenomenon in which the guide vane opening degree becomes large again. However, when the control gains in the rotational speed controller 12, especially the control gain of the integral control function 15 is set to be large, the response of the rotational speed controller 12 corresponding to the load change is faster than the initial plan, and then the water pressure fluctuation attenuation becomes slow and the load fluctuation becomes excessive, which is disadvantageous.

FIG. 12 is a power generation start analysis example in the same example as the load breaking actual measurement chart example in the conventional pumped storage power generation apparatus illustrated in FIG. 11 in a case where the power generation starts when the inlet valve is full opening with the conventional pumped storage power generation apparatus to which the configuration example illustrated in FIGS. 7 to 9 is applied. The vertical axis represents the GV servo stroke ratio, the inlet valve opening degree, the rotational speed, the rotational speed change rate, and the effective head change rate. The horizontal axis represents the elapsed time from the start of opening of the bypass valve.

In FIG. 12, the time from the full closing to the full opening of the bypass valve of the inlet valve is assumed to 5 seconds and the time thereafter for opening the downstream seal of the inlet valve is assumed to be 5 seconds, the time from the full closing to the full opening of the inlet valve body is assumed to be 50 seconds, and the total operation time to the full opening related to the inlet valve is assumed to be 60 seconds.

In this example, in the case where the power generation starts when the inlet valve is full opening, the output increase start timing of the load limiter 21 is at the time when the inlet valve is full opening and thus is assumed to be at 60 seconds from the start of opening of the bypass valve, and the change time from 0% to 100% of the output signal of the load limiter 21 is assumed to be 60 seconds. The effective head change rate (He–Hei)/Hei from the initial effective head Hei during the guide vane opening degree increases from the full closing to the start opening degree decreases by about 6%, and after the lapse of 110 seconds from the start of opening of the bypass valve at which the rotational speed reaches the rated rotational speed $N_o$, the effective head change rate changes from +2.6% to −2.0%. The rotational speed change rate $(N-N_o)/N_o$ fluctuates between −0.19% and 0.19% after reaching the maximum of about 0.8% due to the influence of the guide vane opening and closing control by the rotational speed controller 12, and the rotational speed fluctuation is large, so that it is assumed that parallelization by the automatic synchronization apparatus becomes slow.

FIG. 13 is a power generation start analysis example in a case where the power generation starts when the inlet valve is middle opening with the conventional pumped storage power generation apparatus in the same example as FIG. 12. The total operation time of the bypass valve of the inlet valve, the downstream seal of the inlet valve, and the inlet valve body in FIG. 13 is set to be the same as that in FIG. 12.

In FIG. 13, in a case where the output of the load limiter 21 starts to increase when the inlet valve is middle opening, the output increase start timing of the load limiter 21 is assumed to the timing when the inlet valve opening degree is about 33% and assumed to be at 27 seconds from the start of opening of the bypass valve, and the change time from 0% to 100% of the output signal of the load limiter 21 is assumed to be 60 seconds. The effective head rate (He–Hei)/Hei from the initial effective head Hei during the guide vane opening degree increases from the full closing to the start opening degree decreases by about 7.5%, which is slightly larger due to operation in parallel with the inlet valve opening operation, and the effective head change rate is a change within a range of +2.5% to −2.0% after the lapse of 100 seconds from the start of the bypass valve opening at which the rotational speed reaches the rated rotational speed $N_o$, and the rotational speed change rate $(N-N_o)/N_o$ fluctuates within a range of −0.19% to 0.18%, which is similar to or slightly larger than that of the power generation start analysis example in the case where the power generation starts when the inlet valve is full opening illustrated in FIG. 12, after reaching the maximum of about 0.8% due to the influence of the guide vane opening and closing control by the rotational speed controller 12, and the rotational speed fluctuation is large, so that it is assumed that parallelization by the automatic synchronization apparatus cannot be faster.

In the controller applied to the power generation apparatus or pumped storage power generation apparatus configured as described above, a method of changing the output increase start timing of the conventional load limiter 21 from the full opening of the inlet valve to the middle opening of the inlet valve is applied as a way of shortening the power generation startup time of the power generation apparatus or pumped storage power generation apparatus. However, comparing to the case where the turbine starts from the inlet valve full opening as illustrated in FIG. 12, in the case where the turbine starts from the inlet valve middle opening illustrated in FIG. 13, the inlet valve opening operation and the guide vane opening operation are performed in parallel after the inlet valve middle opening degree at which the output increase of the load limiter 21 is started, and thus the rotational speed change rate $(N-N_o)/N_o$ fluctuates in a range similar to or larger than that of the power generation start analysis example in the case where the power generation starts when the inlet valve is full opening as described above. Therefore, it is determined that the parallelization by the automatic synchronization apparatus cannot be faster, and the startup time is only shortened by about the time corresponding to the advance of the output increase start timing of the load limiter 21 from inlet valve full opening to inlet valve middle opening.

CITATION LIST

Patent Literature

Patent Literature 1: Japanese Patent No. 6446569 (U.S. Pat. No. 10,326,393 B2, EP Patent No. EP 3 396 847 A1)

SUMMARY

Technical Problem

In the power generation operation of the conventional power generation apparatus and pumped storage power generation apparatus, a rotational speed controller including a proportional control element, an integral control element, and a differential control element receives a value obtained by dividing the difference between the rotational speed corresponding to the frequency of the commercial power system and the rotor rotational speed by the rated rotational speed to control the guide vane opening degree and then control the rotational speed and the load output. However, the guide vane opening degree command value corresponding to the load output is held in the integral control element. Therefore, at the time of load breaking, parallelization is off by the breaker and the generator output is lost, so that the rotor rotational speed rapidly increases, the input to the rotational speed controller becomes negative and the command value to rapidly make the guide vane opening degree to the closure opening degree is output, and the guide vane is closed at the guide vane closing rate set in the guide vane operation mechanism, so that the guide vane opening degree command value held in the integral control element is gradually decreased.

However, in the power generation apparatus or pumped storage power generation apparatus connected to the long conduit, or in the power generation apparatus or pumped storage power generation apparatus that performs the generator voltage building-up operation in response to the blackout of the power system, it is necessary to set the gain of each control element in the rotational speed controller to be small in order to prevent the water pressure fluctuation of the conduit from becoming excessive or to make the change in power supply to the system after the blackout gentle and smooth. At the time of load breaking, the gain setting of, in particular, the integral control element becomes small, that is, the set time constant of the integral control element becomes long, so that the decrease, due to the increase in the rotational speed, of the guide vane opening degree command value held in the integral control element becomes slow. Therefore, after the guide vane opening degree decreases and the rotational speed indicates the maximum value, the speed starts to decrease, and when the speed becomes close to the rated rotational speed so that the guide vane opening degree closing command from the proportional control element becomes small and close to zero, a phenomenon in which the guide vane opening degree command value from the rotational speed controller according to the guide vane opening degree command value held in the integral control element exceeds the guide vane opening degree occurs, and then a phenomenon in which the guide vane opening degree increases again occurs.

Furthermore, in load breaking of the conventional power generation apparatus and pumped storage power generation apparatus, in a situation in which the guide vane opening degree is decreased to the vicinity of the no-load opening degree, the guide vane opening degree command value held in the integral control element of the rotational speed controller is in an overtightening state to be fully closed in some cases with respect to the no-load opening degree due to continuation of the state in which the rotational speed exceeds the rated rotational speed until then, and a swinging phenomenon with a large amplitude in which the guide vane opening degree is in the vicinity of the no-load opening degree and the rotational speed is in the vicinity of the rated rotational speed often continues.

In addition, in a power generation apparatus driven by a Pelton turbine, opening and closing of a deflector are controlled by a rotational speed controller including a proportional control element, an integral control element, and a differential control element based on a rotational speed deviation. The rotational speed controller holds the deflector opening degree command value in the integral control element. Therefore, at the time of load breaking, after the rotational speed indicates the maximum value, the rotational speed starts to decrease to become close to the rated rotational speed, and when, in this situation, the deflector closing command from the proportional control element decreases to become close to zero, a phenomenon in which the deflector opening degree command value from the rotational speed control circuit according to the deflector opening degree command value held in the integral control element exceeds the deflector opening degree occurs, and a phenomenon in which the deflector opening degree increases again occurs.

Solution to Problem

In order to solve the problem, according to an aspect of the present invention, there is provided (1) a method of controlling a power generation apparatus and a pumped storage power generation apparatus, including: controlling, as a control target apparatus, a power generation apparatus or pumped storage power generation apparatus including a motor directly connected to a rotor of a generator or generator motor synchronously connected to a commercial power system, the motor being configured to drive the rotor in power generation operation and configured to be driven by the rotor in pumping operation, and performing, in the power generation operation, speed control by providing a guide vane opening degree command to the motor, the guide vane opening degree command being calculated, on a basis of a deviation between a rotational speed corresponding to a frequency of the commercial power system and a rotational speed of the rotor, by a rotational speed controller including a proportional control element, an integral control element, and a differential control element, wherein a first upper limit limiting function is multiplied by a second upper limit limiting function, the first upper limit limiting function being included in an output runaway prevention circuit of an integral control function provided in the integral control element and being defined according to an output signal of a load limiter, the second upper limit limiting function being defined according to a rotational speed deviation and changing within a range up to a constant value equal to or less than 1 according to a difference between a rotational speed corresponding to the frequency of the commercial power system and the rotational speed of the rotor, in a case where the rotational speed of the rotor exceeds a rotational speed corresponding to the frequency of the commercial power system, an output of a guide vane opening degree command according to an output of an accumulation in the integral control function is limited, and a difference between the integral control function and an output value of the runaway prevention circuit is further fed back to an input of the integral control function and is subtracted from a rotational speed deviation to forcibly decrease the accumulation in the integral control function. In addition, according to another aspect of the present invention, there is provided (2) the method of controlling a power generation apparatus and a pumped storage power generation apparatus, wherein a lower limit limiting function defined according to an output signal of the load limiter is configured to set a lower limit value of an output of the accumulation in the integral control function to a value obtained by multiplying a no-load opening degree set according to a static head in power generation operation by a limit value defined within a range up to a constant value less than 1, excessive closing of the guide vane opening degree is restricted in no-load operation in a state where parallelization is off by a breaker during startup or occurrence of load breaking, and a difference between the integral control function and an output lower limit value of the runaway prevention circuit is further fed back to an input of the integral control function and is subtracted from a rotational speed deviation to forcibly increase the accumulation in the integral control function.

Advantageous Effects of Invention

The present invention has the configuration described in (1) to prevent the phenomenon in which the guide vane opening degree command value from the rotational speed controller according to the guide vane opening degree command value held in the integral control function greatly exceeds the guide vane opening degree from occurring even when after the rotational speed indicates the maximum value, the rotational speed starts to decrease to become close to the rated rotational speed, and the guide vane closing command from the proportional control element decreases to become close to zero, so that it is possible to prevent occurrence of the phenomenon in which the guide vane opening degree increases again. In addition, with the configuration described in (2), it is possible to prevent the guide vane opening from swinging with a large amplitude in the vicinity of the no-load opening degree and the rotational speed from swinging with a large amplitude in the vicinity of the rated rotational speed when the opening degree is in the vicinity of the no-load opening degree at the time of load breaking or startup of power generation. Note that, it can be expected that the prevention of the guide vane opening degree from swinging with a large amplitude in the vicinity of the no-load opening degree at the time of load breaking or startup of power generation, and the prevention of the rotational speed from swinging with a large amplitude in the vicinity of the rated rotational speed when the opening degree is in the vicinity of the no-load opening degree at the time of load breaking or startup of power generation are effective when the invention is applied to a general turbine power generation apparatus or pumped storage power generation apparatus in which the control gain of each control element of the rotational speed controller is large.

DESCRIPTION OF EMBODIMENTS

Hereinafter, an embodiment of a method of controlling a power generation apparatus and a pumped storage power generation apparatus according to the present invention will be described in detail with reference to the drawings. Note that the present invention is not limited by the embodiment.

Embodiment

Figure 1:
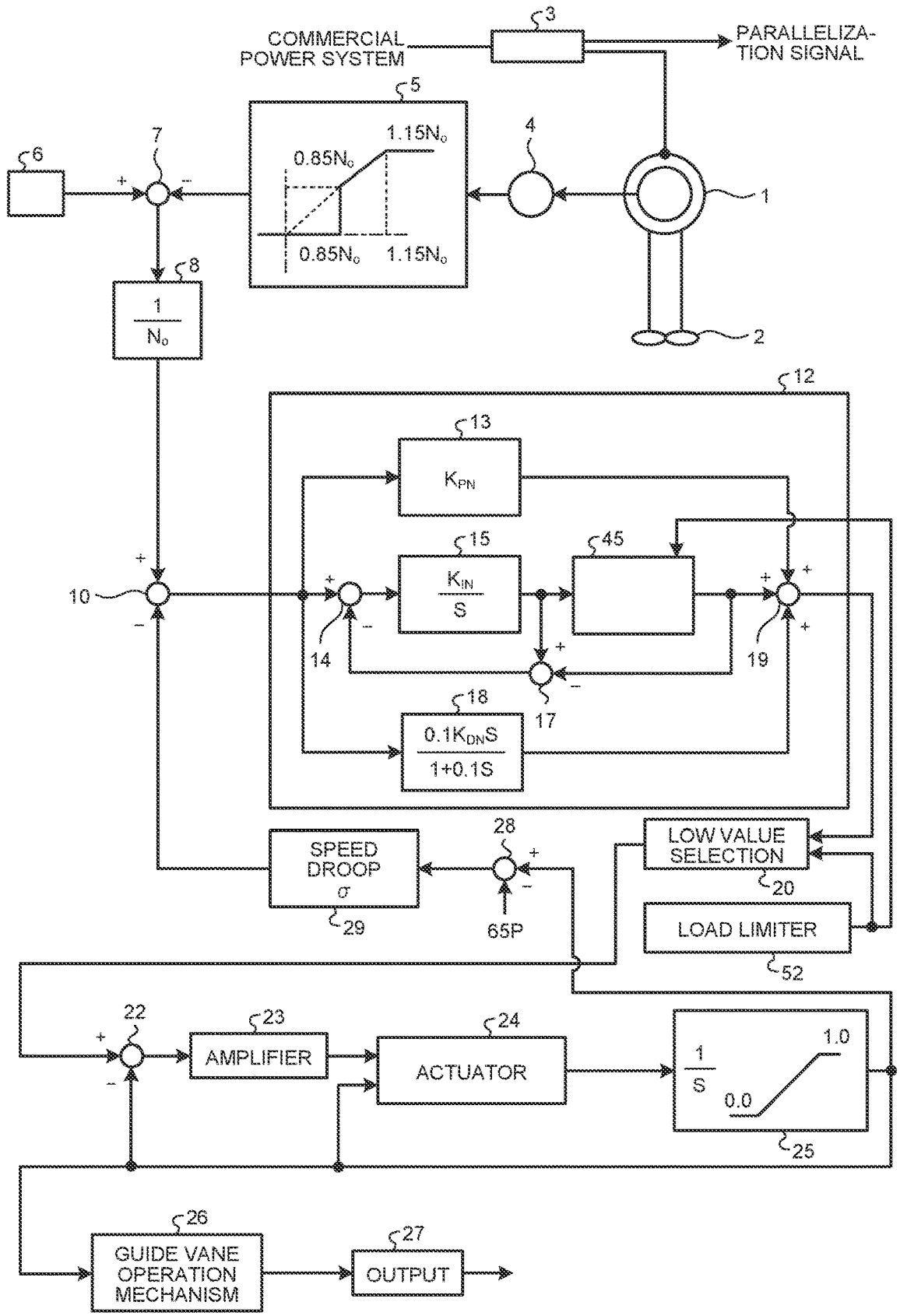
FIG. 1 is a configuration diagram of a power generation apparatus or pumped storage power generation apparatus according to an embodiment of the present invention.

FIG. 1 is a configuration diagram of a power generation apparatus or pumped storage power generation apparatus according to an embodiment of the present invention. In FIG. 1, the same reference signs as those in FIG. 7 described above used to describe the conventional example denote the same or similar parts.

Figure 7:
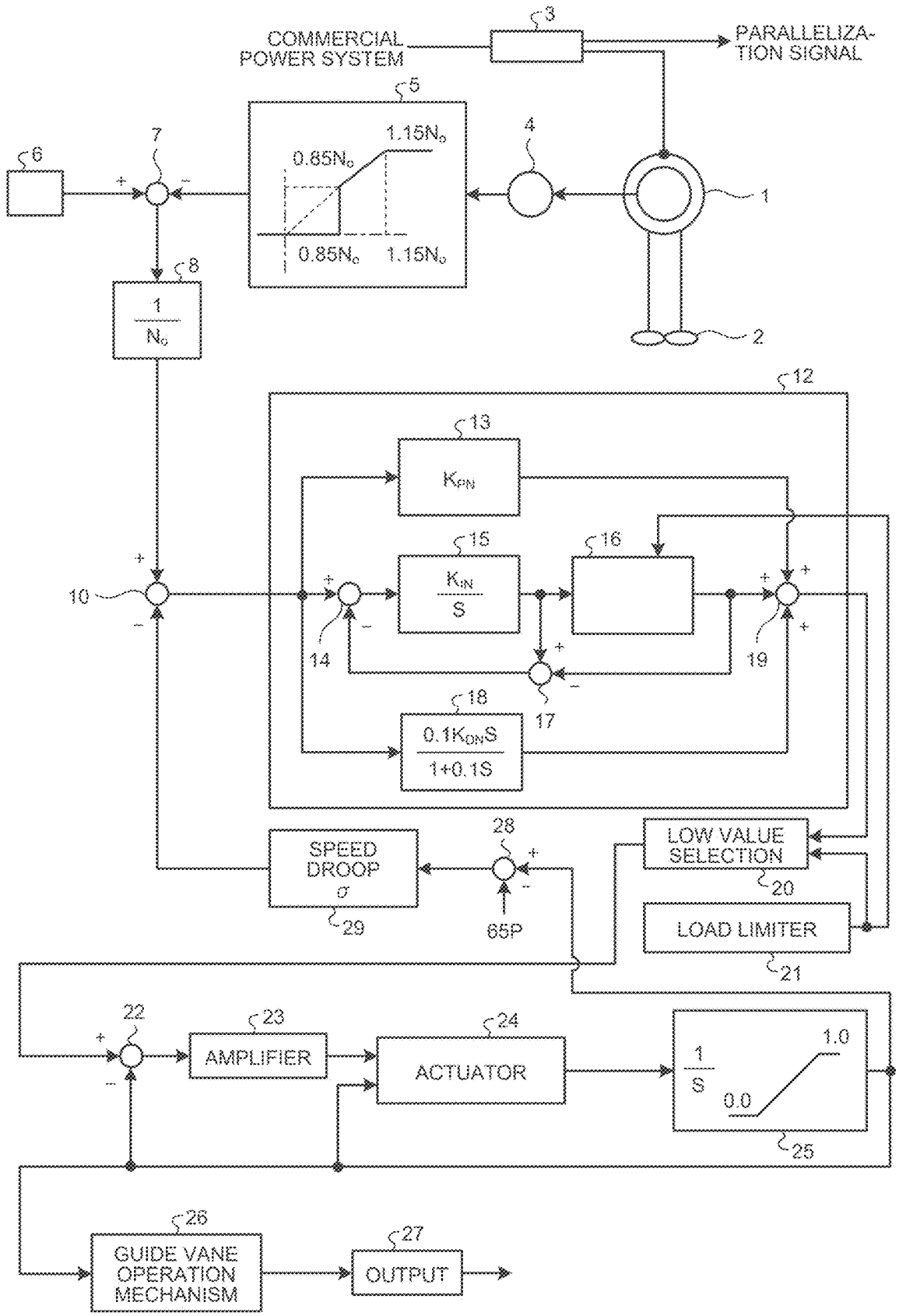
FIG. 7 is a configuration diagram of a conventional power generation apparatus or pumped storage power generation apparatus.

The configuration illustrated in FIG. 1 is substantially the same as the configuration of the conventional power generation apparatus or pumped storage power generation apparatus illustrated in FIG. 7, but the following two points are changed.

The first change is that the output runaway prevention circuit 16 of the integral control function of the conventional rotational speed controller in the integral control element provided in the rotational speed controller 12 is changed to an output runaway prevention circuit 45. Details of the output runaway prevention circuit 45 included in the rotational speed controller 12 of the power generation apparatus or pumped storage power generation apparatus according to the present embodiment will be separately described with reference to FIG. 2.

The second change is that the load limiter 21 is changed to a load limiter 52. Details of the load limiter 52 of the power generation apparatus or pumped storage power generation apparatus according to the present embodiment will be separately described with reference to FIG. 3.

Figure 2:
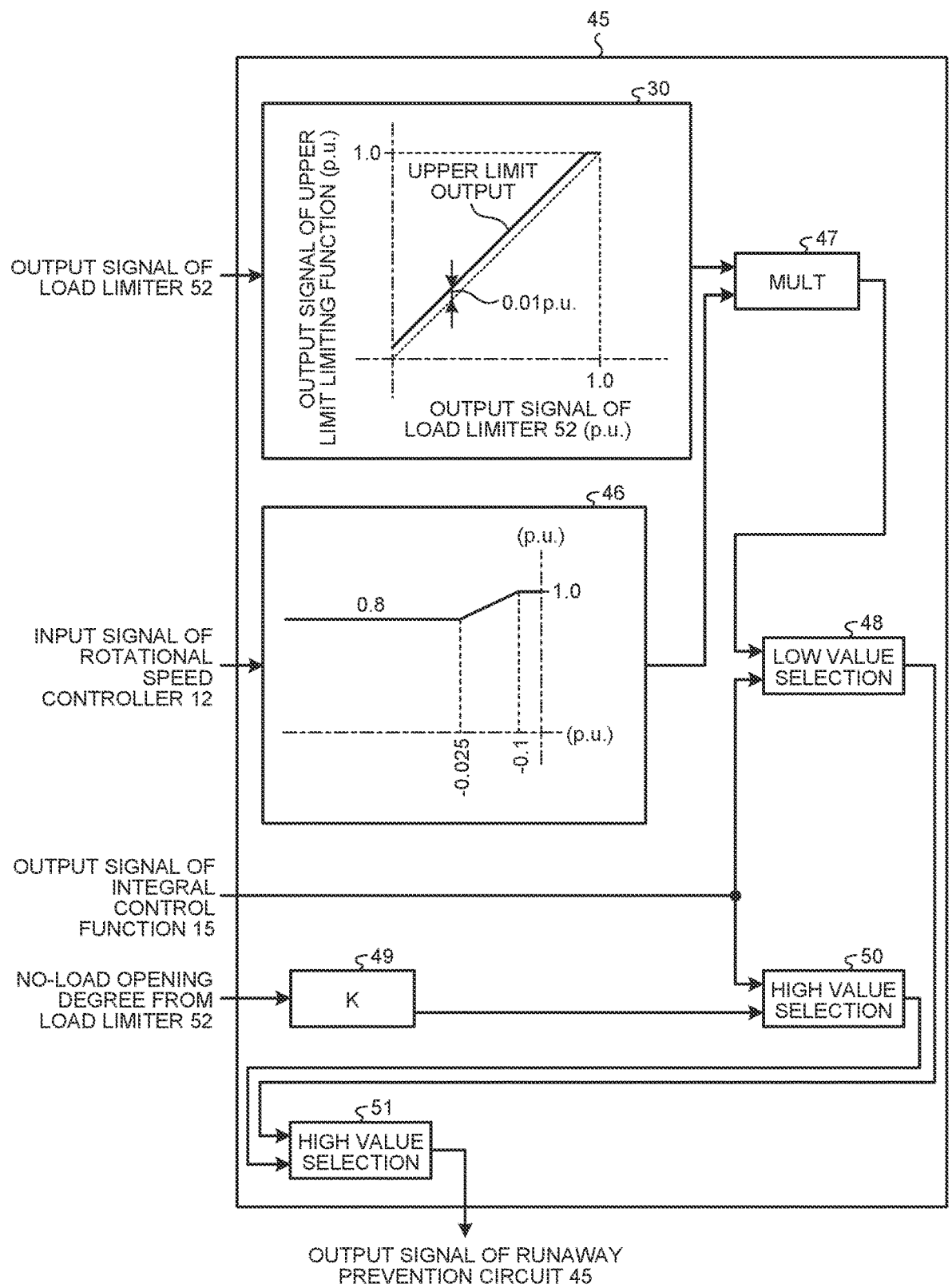
FIG. 2 is a configuration diagram of an output runaway prevention circuit of an integral control function of a rotational speed controller of the power generation apparatus or pumped storage power generation apparatus according to the embodiment of the present invention.
Figure 8:
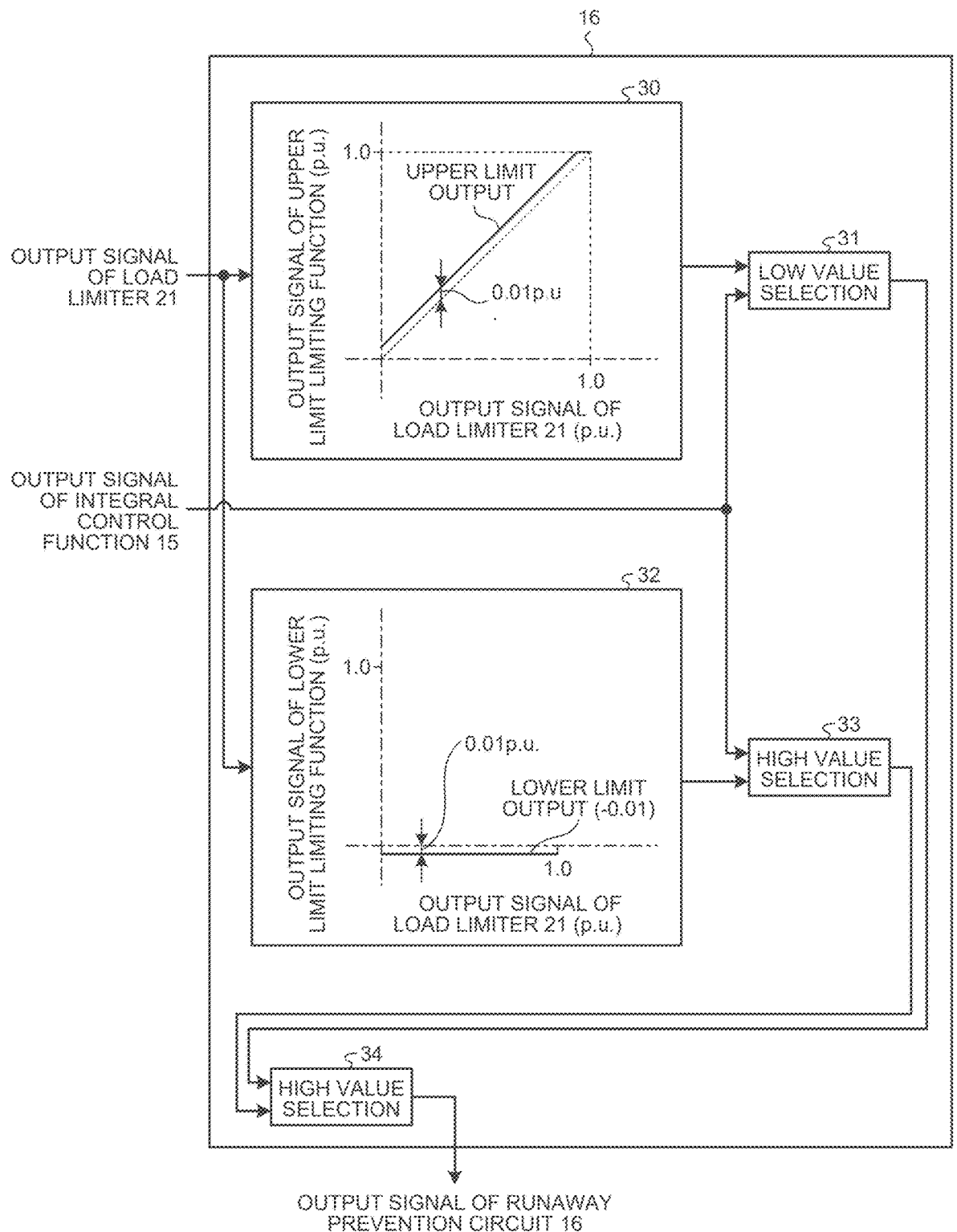
FIG. 8 is a configuration diagram of an output runaway prevention circuit of an integral control function of a rotational speed controller of the conventional power generation apparatus or pumped storage power generation apparatus.

The output runaway prevention circuit 45 included in the rotational speed controller 12 illustrated in FIG. 1 will be described. FIG. 2 is a configuration diagram of the output runaway prevention circuit 45 of the integral control function of the rotational speed controller of the power generation apparatus or pumped storage power generation apparatus according to the embodiment of the present invention. In FIG. 2, the same reference signs as those of the output runaway prevention circuit 16 of the integral control function of the rotational speed controller of the conventional power generation apparatus or pumped storage power generation apparatus illustrated in FIG. 8 denote the same or similar parts.

Reference sign 30 denotes an upper limit limiting function of the output runaway prevention circuit 45. The upper limit limiting function 30 of the output runaway prevention circuit 45 receives the output signal of the load limiter 52 to be described below, adds 0.01 p.u. to the value of the output signal of the load limiter 52, and outputs the result while limiting the maximum value to 1.0 p.u.

Reference sign 46 denotes an upper limit limiting function for the upper limit limiting function 30 that is a first upper limit limiting function of the output runaway prevention circuit 45, and is a second upper limit limiting function of the output runaway prevention circuit 45. The upper limit limiting function 46, which is the second upper limit limiting function of the output runaway prevention circuit 45, receives an input signal of the rotational speed controller 12, outputs a value of 0.8 when the input signal of the rotational speed controller 12 is −0.025 p.u. or less and outputs a value linearly changing from 0.8 to 1.0 when the input signal of the rotational speed controller 12 is in the range of −0.025 p.u. to −0.1 p.u., and outputs a value of 1.0 when the input signal of the rotational speed controller 12 is in the range of −0.1 p.u. or more.

Reference sign 47 denotes a multiplier. The multiplier 47 receives the output signal of the upper limit limiting function 30 and the output signal of the upper limit limiting function 46 described above, multiples the received signals, and outputs the result.

Reference sign 48 denotes a minimum value selection function. The minimum value selection function 48 compares the output signal of the multiplier 47 with the output signal of the integral control function 15 to select and output the minimum value. Reference sign 49 denotes a gain multiplier. The gain multiplier 49 multiplies a no-load opening degree signal according to the static head, which is output from the load limiter 52 illustrated in FIG. 3 to be described below, by a constant value less than 1.0, and outputs the result as a lower limit value of the output runaway prevention circuit 45. Reference sign 50 denotes a maximum value selection function. The maximum value selection function 50 compares the output signal of the integral control function 15 with the output signal of the gain multiplier 49 to select and output the maximum value. Reference sign 51 denotes a maximum value selection function. The maximum value selection function 51 compares the output signal of the minimum value selection function 48 with the output signal of the maximum value selection function 50 to select the maximum value, and outputs the result as the output signal of the output runaway prevention circuit 45.

Figure 3:
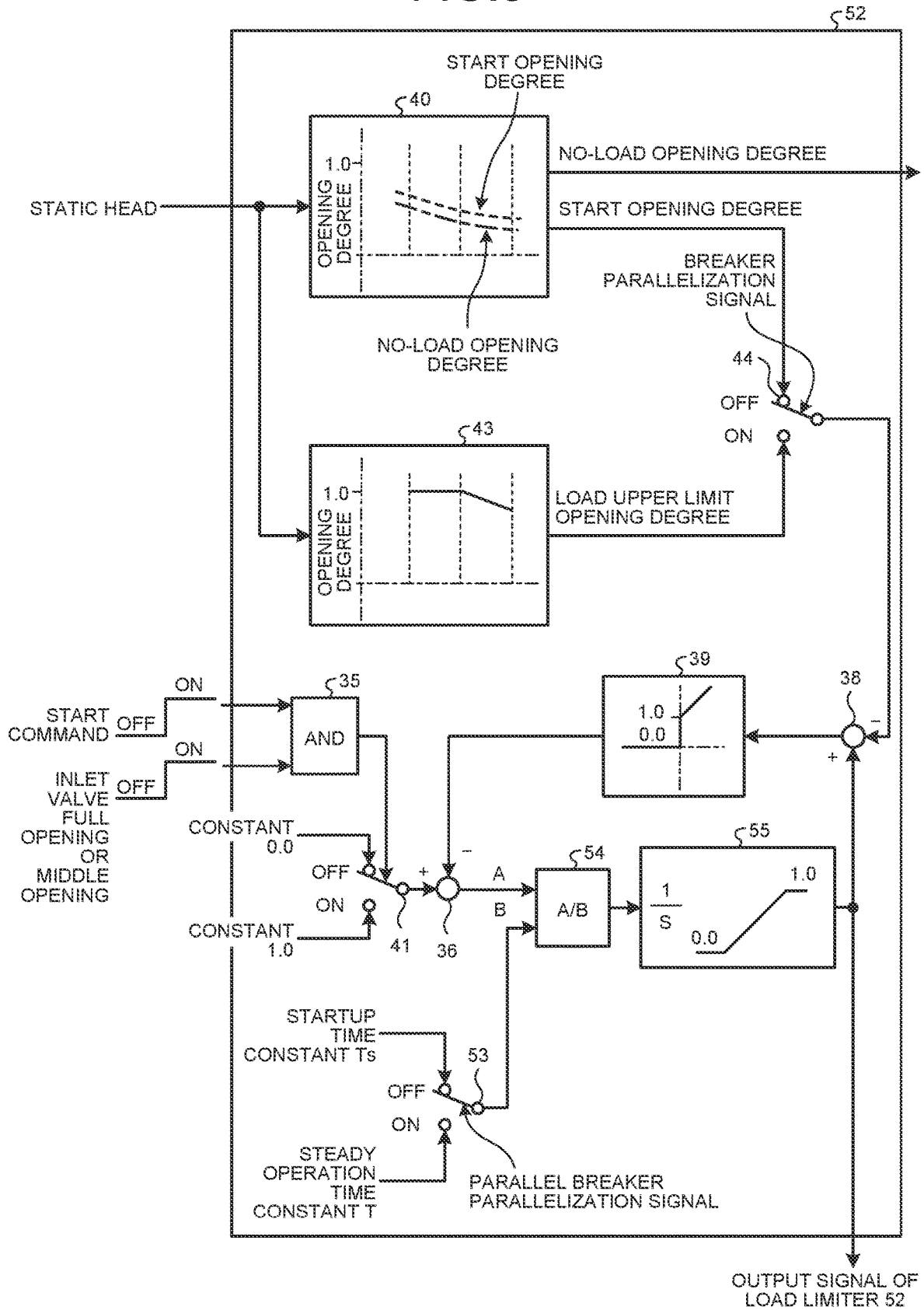
FIG. 3 is a configuration diagram in an example in which the output of a load limiter is increased from full opening or middle opening of the inlet valve of the load limiter of the power generation apparatus or pumped storage power generation apparatus according to the embodiment of the present invention.
Figure 9:
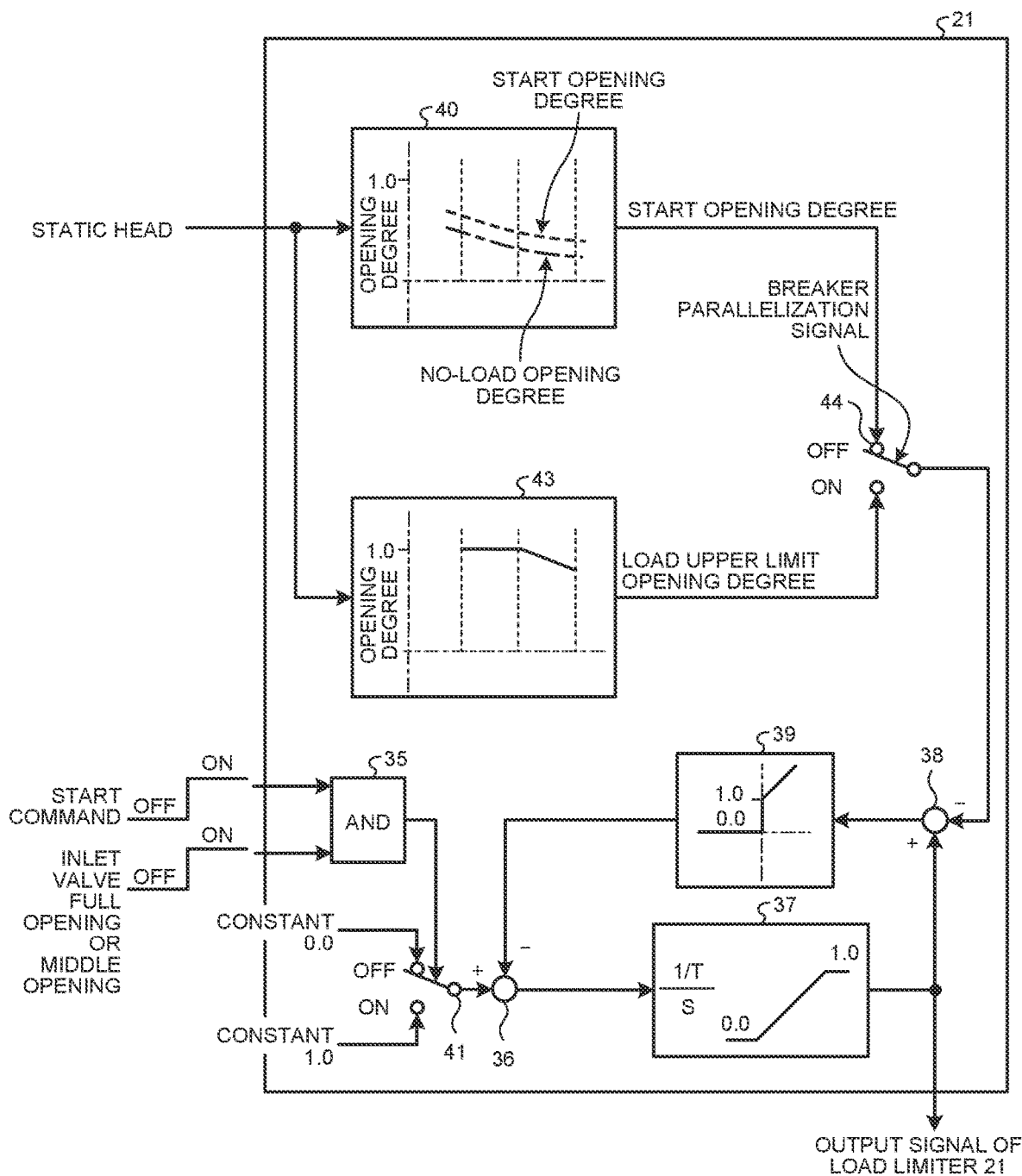
FIG. 9 is a configuration diagram in an example in which the output of a load limiter is increased from full opening or middle opening of the inlet valve of the load limiter of the conventional power generation apparatus or pumped storage power generation apparatus.
Figure 10:
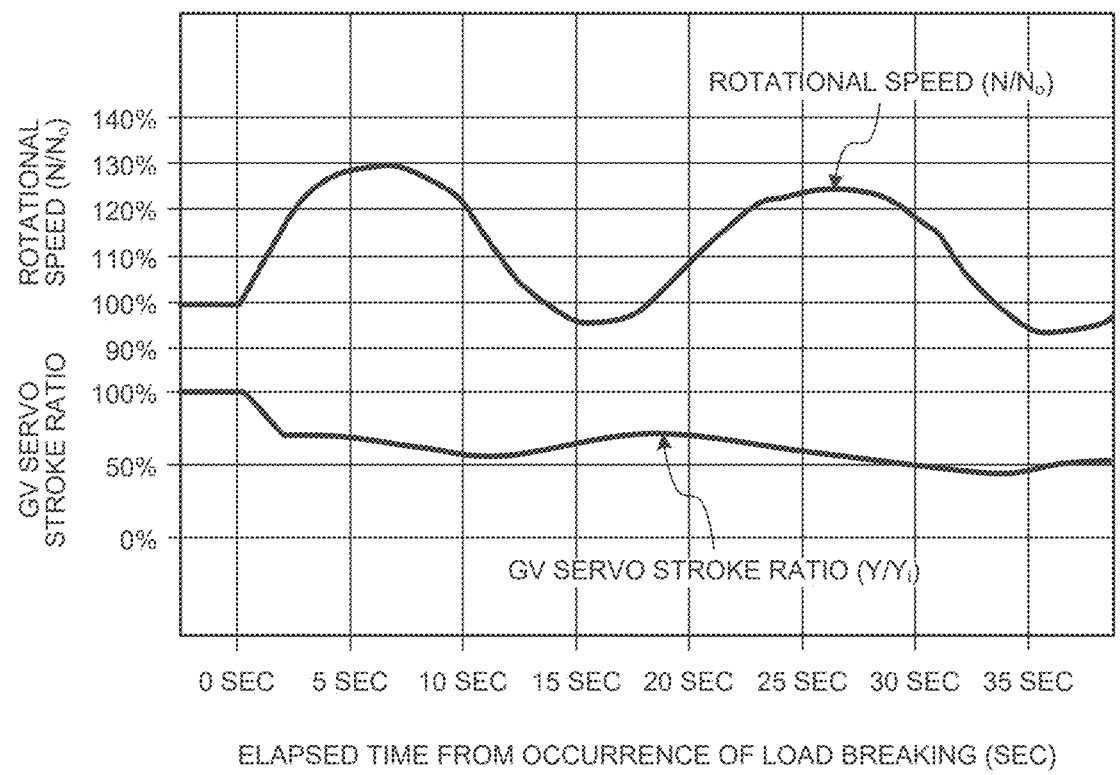
FIG. 10 illustrates a load breaking actual measurement chart example in the conventional pumped storage power generation apparatus.

Next, the load limiter 52 illustrated in FIG. 1 will be described. Here, an example in which the output of the load limiter 52 is increased from full opening or middle opening of the inlet valve of the load limiter 52 will be described with reference to the configuration diagram illustrated in FIG. 3. In FIG. 3, the same reference signs as those in the configuration diagram illustrated in FIG. 9 denote the same or similar parts.

Reference sign 40 denotes a no-load opening degree and start opening degree setting function. The no-load opening degree and start opening degree setting function 40 receives a static head, and outputs a no-load opening degree signal according to the static head and a start opening degree signal obtained by adding a constant value to the no-load opening degree. Reference sign 43 denotes a load upper limit opening degree setting function. The load upper limit opening degree setting function 43 receives the static head and outputs a load upper limit opening degree signal according to the static head. Reference sign 44 denotes a signal switch. The signal switch 44 receives an output signal of the start opening degree setting function 40 and an output signal of the load upper limit opening degree setting function 43. The signal switch 44 selectively outputs the output signal of the start opening degree setting function 40 when the parallelization signal output from the breaker 3 illustrated in FIG. 1 is OFF, and selectively outputs the output signal of the load upper limit opening degree setting function 43 when the parallelization signal is ON.

Reference sign 35 denotes an AND. The AND 35 receives the ON/OFF signal of the start command of the power generation apparatus or pumped storage power generation apparatus and the ON/OFF signal for the inlet valve full opening or middle opening, ANDs the received signals, and outputs the result. Reference sign 41 denotes a signal switch. The signal switch 41 receives the constant 0.0 and the constant 1.0, selects and outputs the constant 0.0 when the output signal of the AND 35 is OFF, and selects and outputs the constant 1.0 when the output signal of the AND 35 is ON. Reference sign 36 denotes a subtractor. The subtractor 36 subtracts an output value of a feedback signal generation function 39 to be described below from the output value of the signal switch 41 and outputs the result. Reference sign 53 denotes a signal switch. The signal switch 53 receives a startup time constant Ts and a steady operation time constant T as time constants of an integrator 55 to be described below, and selects and outputs the startup time constant Ts when the parallel breaker parallelization signal is OFF and selects and outputs the steady operation time constant T when the parallel breaker parallelization signal is ON.

Reference sign 54 denotes a divider. The divider 54 receives the output signal of the subtractor 36 and the output signal of the signal switch 53, divides the output signal of the subtractor 36 by the output signal of the signal switch 53, and outputs the result. Reference sign 55 denotes an integrator. The integrator 55 receives the output signal of the divider 54, and outputs a value obtained by integrating the received value as the output signal of the load limiter 52.

Reference sign 38 denotes a subtractor. The subtractor 38 subtracts the output value of the signal switch 44 from the output value of the integrator 55 and outputs the result. Reference sign 39 denotes a feedback signal generation function. The feedback signal generation function 39 receives the output signal of the subtractor 38, outputs 0.0 when the received signal is less than 0.0 and outputs a value obtained by adding 1.0 to the received signal when the input signal is 0.0 or more, and inputs the value to the subtractor 36.

Figure 4:
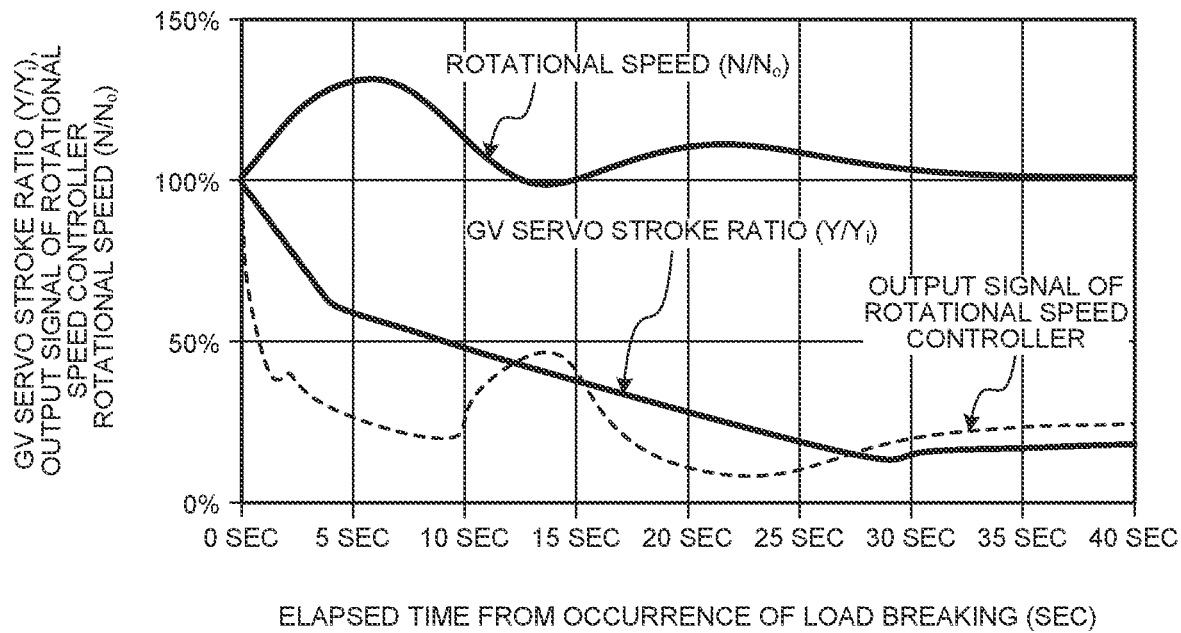
FIG. 4 illustrates a load breaking analysis example in the pumped storage power generation apparatus according to the embodiment of the present invention.
Figure 11:
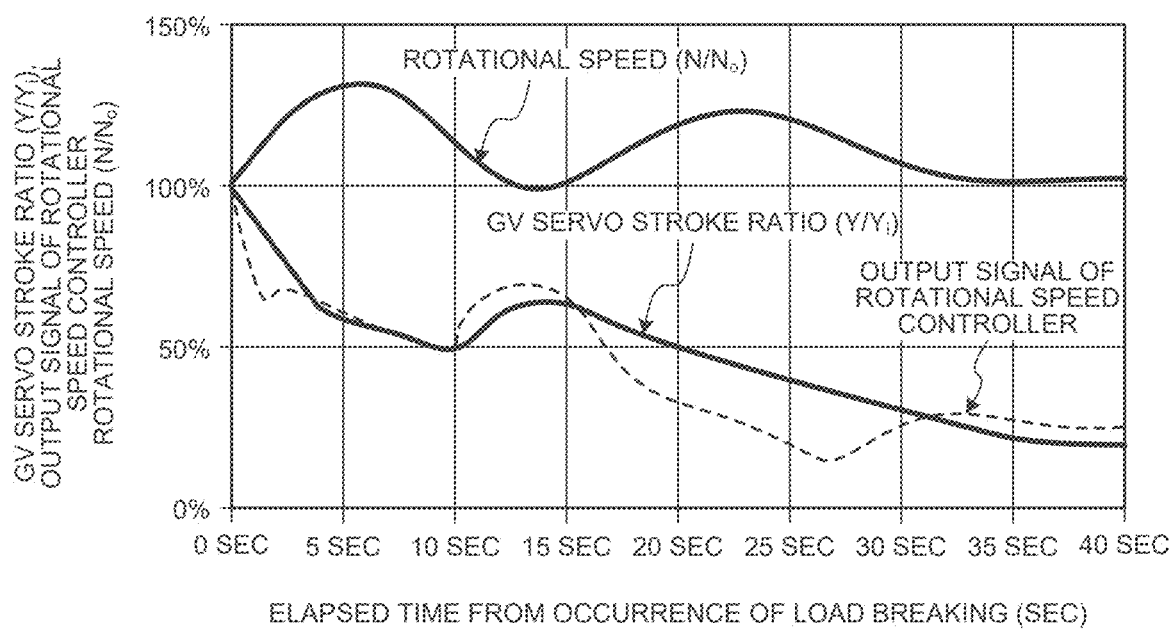
FIG. 11 illustrates a load breaking analysis example in the conventional pumped storage power generation apparatus.
Figure 12:
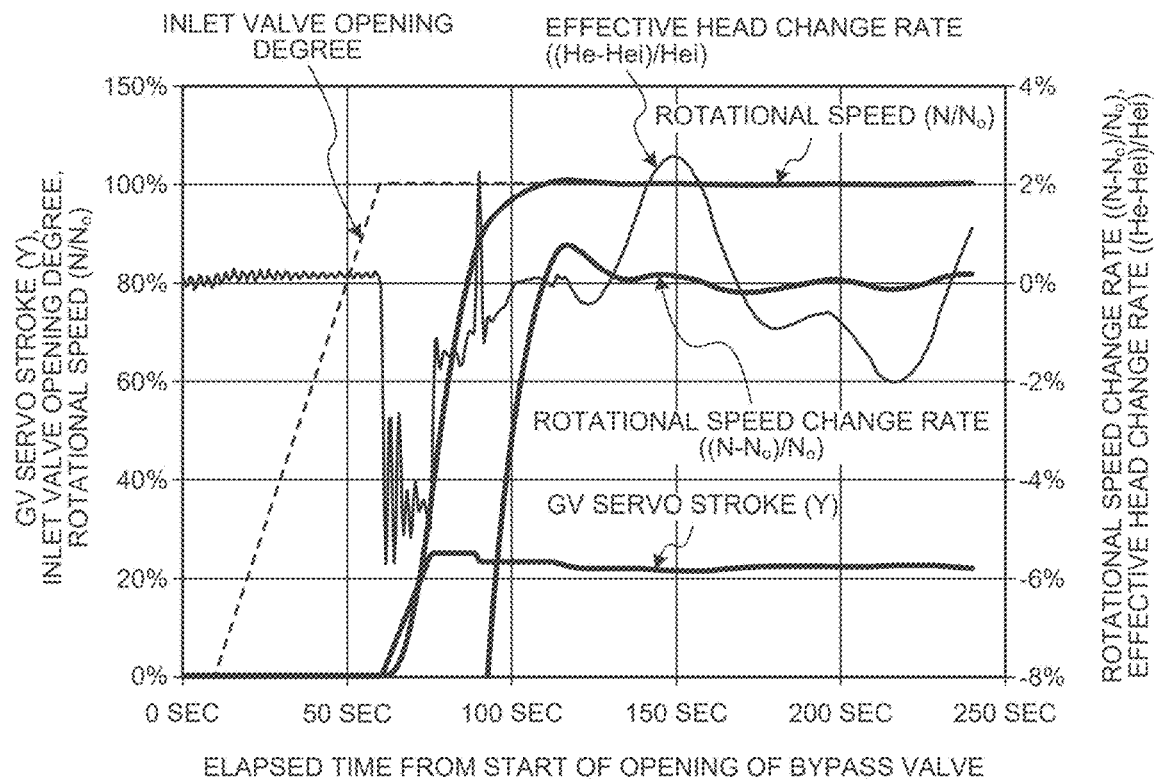
FIG. 12 illustrates a power generation start analysis example in a case where the power generation starts when the inlet valve is full opening with the conventional pumped storage power generation apparatus.

FIG. 4 is a load breaking analysis example in the pumped storage power generation apparatus according to the embodiment of the present invention. FIG. 4 is an analysis obtained by applying the embodiment of the present invention illustrated in FIGS. 1 to 3 to the load breaking analysis example in the conventional pumped storage power generation apparatus illustrated in FIG. 11.

In FIG. 4, the output signal of the rotational speed controller 12 decreases to about 20% when the elapsed time from the occurrence of the load breaking is about 10 seconds, and the subsequent decrease in the rotational speed decreases the guide vane opening degree closing command from the proportional control element. Due to these facts, occurrence of the phenomenon in which the guide vane opening degree increases again is prevented although the output signal of the rotational speed controller 12 slightly exceeds the GV servo stroke ratio. Furthermore, in a situation where the GV servo stroke ratio is in the vicinity of the no-load opening degree after the elapsed time from the occurrence of the load breaking is 25 seconds, the excessive closing of the guide vane opening degree is restricted by the output of the gain multiplier 49, which is the lower limit value of the output runaway prevention circuit 45 illustrated in FIG. 2, the occurrence of the swing phenomenon with a large amplitude in which the guide vane opening degree is in the vicinity of the no-load opening degree and the rotational speed is in the vicinity of the rated rotational speed is prevented, and the rotational speed is smoothly converged to the rated rotational speed.

Figure 5:
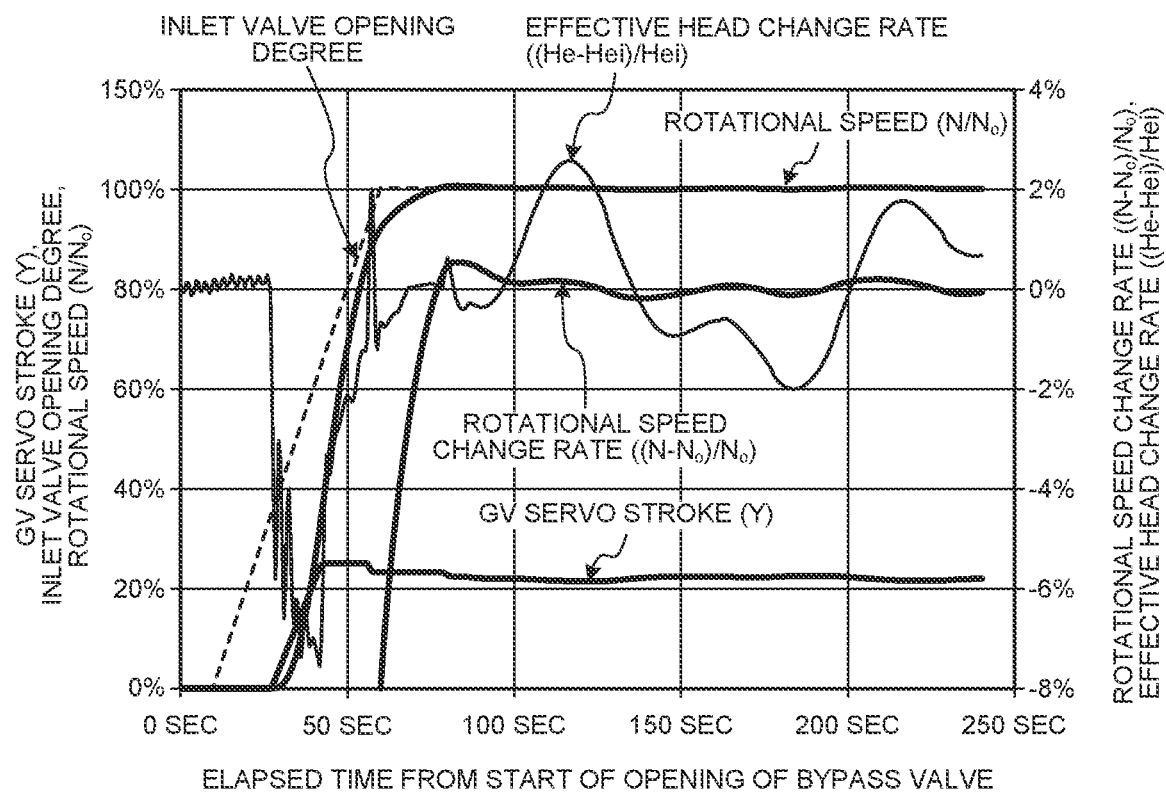
FIG. 5 illustrates a power generation start analysis example in a case where the power generation starts when the inlet valve is middle opening with the pumped storage power generation apparatus according to the embodiment of the present invention.

FIG. 5 is a power generation start analysis example in a case where the power generation starts when the inlet valve is middle opening with the pumped storage power generation apparatus according to the embodiment of the present invention. FIG. 5 is an analysis obtained by applying the embodiment of the present invention illustrated in FIGS. 1 to 3 to the power generation start analysis example in which the power generation starts when the inlet valve is middle opening with the conventional pumped storage power generation apparatus illustrated in FIG. 13. Note that, the same value as the steady operation time constant T is used as the startup time constant Ts illustrated in FIG. 3.

In the example illustrated in FIG. 5, in a case where the output of the load limiter 52 starts to increase when the inlet valve is middle opening, the output increase start timing of the load limiter 52 is assumed to the timing when the inlet valve opening degree is about 33% and assumed to be at 27 seconds from the start of opening of the bypass valve, and the change time from 0% to 100% of the output signal of the load limiter 52 is assumed to be 60 seconds. The effective head change rate (He–Hei)/Hei from the initial effective head Hei during the guide vane opening degree increases from the full closing to the start opening degree decreases by about 7.5% that is large due to the influence of the inlet valve opening operation performed in parallel, and after the lapse of 100 seconds from the start of opening of the bypass valve at which the rotational speed reaches the rated rotational speed $N_o$, the effective head change rate changes from +2.5% to −2.0%. That is, an effect of the output restriction of the rotational speed controller 12 by the upper limit limiting function 46 with respect to the upper limit limiting function 30 of the output runaway prevention circuit 45 is seen. The maximum value 0.8% of the rotational speed change rate $(N-N_o)/N_o$ decreases to about 0.5% as compared with the power generation start analysis example in the case where the power generation starts when the inlet valve is middle opening with the conventional pumped storage power generation apparatus illustrated in FIG. 13, but the subsequent fluctuation range is almost the same and changed from the fluctuation between −0.19% and 0.18% to the fluctuation between −0.19% and 0.18%.

Figure 13:
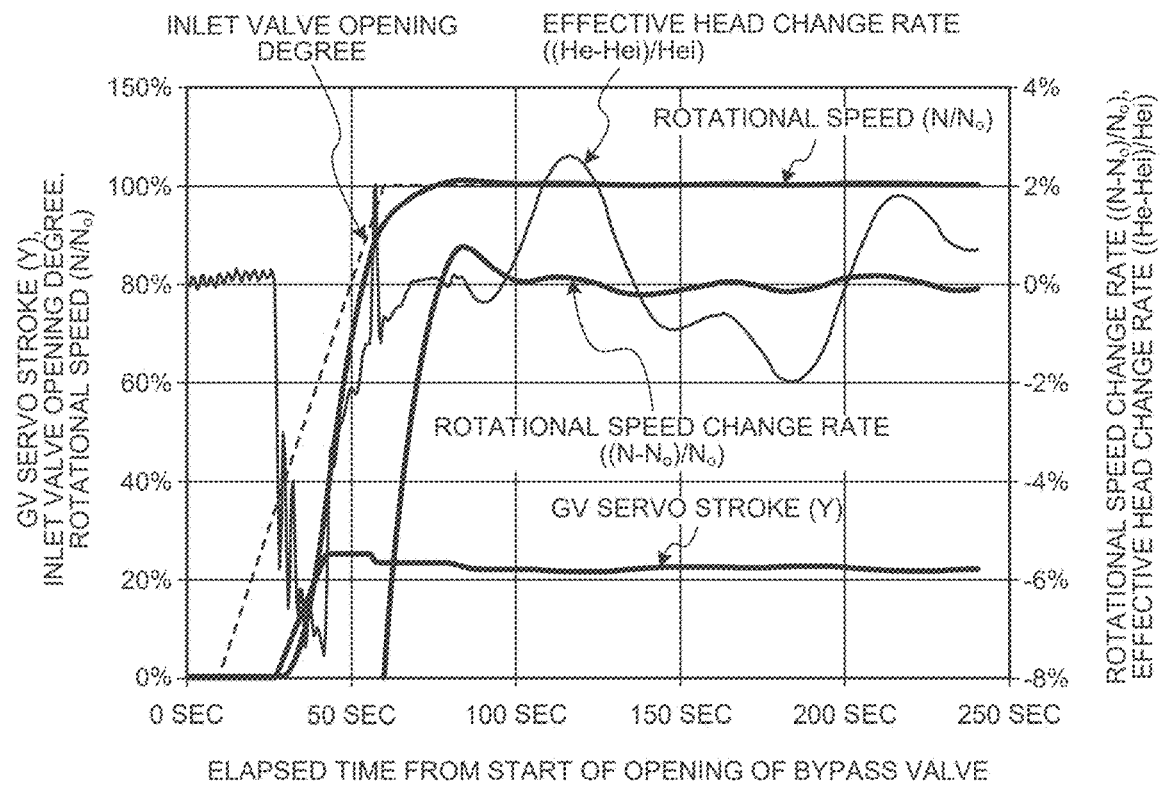
FIG. 13 illustrates another power generation start analysis example in a case where the power generation starts when the inlet valve is middle opening with the conventional pumped storage power generation apparatus.

Therefore, in the controller applied to the power generation apparatus or pumped storage power generation apparatus configured as illustrated in FIGS. 1 to 3 described above, even if a method of changing the output increase start timing of the load limiter 52 from the full opening of the inlet valve to the middle opening of the inlet valve is used to shorten the power generation startup time of the power generation apparatus or pumped storage power generation apparatus, the inlet valve opening and the guide vane opening operate in parallel after the inlet valve middle opening degree at which the output increase of the load limiter 52 is started, similarly to the turbine that starts from the middle opening of the inlet valve illustrated in FIG. 13. Therefore, in a situation where the startup time constant Ts of the load limiter 52 is the same as the steady operation time constant T, as described above, the rotational speed change rate $(N-N_o)/N_o$ fluctuates similarly to that in the power generation start analysis example in the case where the power generation starts when the inlet valve is middle opening with the conventional pumped storage power generation apparatus, so that it is determined that the parallelization by the automatic synchronization apparatus cannot be faster, and the startup time is only shortened by about the time corresponding to the advance of output increase start timing of the load limiter 52 from the inlet valve full opening to the inlet valve middle opening.

Figure 6:
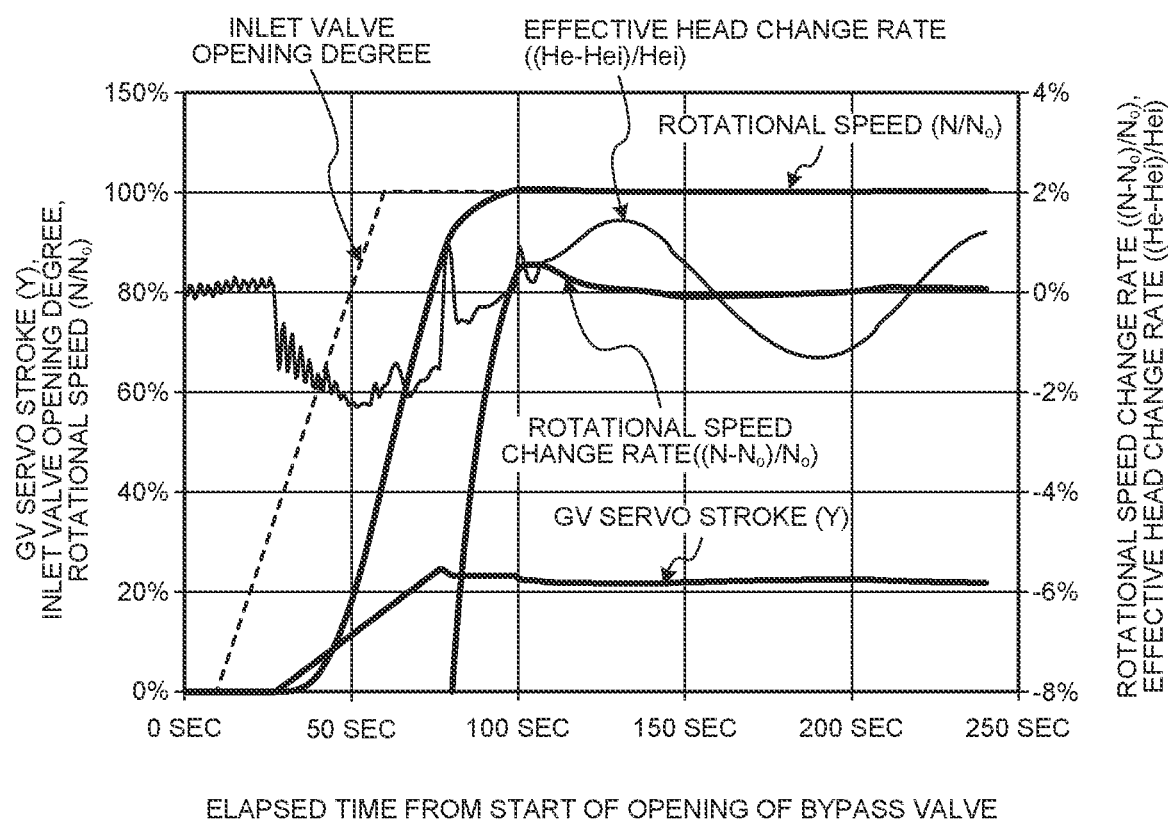
FIG. 6 illustrates a power generation start analysis example in a case where the load limit opening degree signal increase speed during startup is lowered in the case where the power generation starts when the inlet valve is middle opening with the pumped storage power generation apparatus according to the embodiment of the present invention.

FIG. 6 is a power generation start analysis example in a case where the load limit opening degree signal increase speed during startup is lowered in the case where the power generation starts when the inlet valve is middle opening with the pumped storage power generation apparatus according to the embodiment of the present invention. FIG. 6 is an analysis obtained by applying the embodiments of the present invention illustrated in FIGS. 1 to 3 with the startup time constant Ts of the load limit opening degree signal increase speed set to 200 seconds while the steady operation time constant T is 60 seconds.

In FIG. 6, the effective head change rate (He–Hei)/Hei from the initial effective head Hei during the guide vane opening degree increases from the full closing to the start opening degree is about a 2.3% decrease, which is smaller than a 7.5% decrease when the steady operation time constant T is 60 seconds, which is the same as that in this case, due to the effect of setting the startup time constant Ts of the load limit opening degree signal increase speed to 200 seconds. In addition, after 100 seconds elapse after the bypass valve opening starts at which the rotational speed reaches the rated rotational speed $N_o$, the effective head change rate is within a range of +1.4%, to −1.5%, which is smaller than the range of +2.5% to −2.0% within which the effective head change rate changes in the case of FIG. 5 in which the steady operation time constant T is 60 seconds, which is the same as that of this case.

The maximum value of the rotational speed change rate $(N-N_o)/N_o$ is about 0.5%, and there is almost no change as compared with the power generation start analysis example in which the power generation starts when the inlet valve is middle opening, and the steady operation time constant T of the load limit opening degree signal increase speed is 60 seconds, which is the same as that in this case, illustrated in FIG. 5. However, the subsequent fluctuation range is halved from the fluctuation in the range of −0.19% to 0.18% when the steady operation time constant T of the load limit opening degree signal increase speed is 60 seconds, which is the same as that in this case, to a fluctuation in a range of −0.10% to 0.08% after 125 seconds from the start of opening of the bypass valve.

Therefore, in the controller applied to the power generation apparatus or pumped storage power generation apparatus configured as illustrated in FIGS. 1 to 3 described above, a method of changing the output increase start timing of the load limiter 52 from the full opening of the inlet valve to the middle opening of the inlet valve is used to shorten the power generation startup time of the power generation apparatus or pumped storage power generation apparatus, and for the load limit opening degree signal increase speed, the startup time constant Ts is set to 200 seconds while the steady operation time constant T is set to 60 seconds. With this configuration, the inlet valve opening and the guide vane opening are operated in parallel after the middle opening degree of the inlet valve at which the output increase of the load limiter 52 starts to increase similarly to the turbine that starts from the middle opening of the inlet valve illustrated in FIG. 5. However, as described above, the rotational speed change rate $(N-N_o)/N_o$ is almost halved by starting power generation when the inlet valve is middle opening and by setting the startup time constant Ts to 200 seconds while the steady operation time constant T is 60 seconds for the load limit opening degree signal increase speed, and thus it is sufficiently expected to advance parallelization by the automatic synchronization apparatus. As a result, it is expected to significantly shorten the startup time to the parallelization by the breaker.

When the power generation apparatus is a power generation apparatus driven by a Pelton turbine, opening and closing of the deflector are controlled by the rotational speed controller 12. The rotational speed controller 12 holds a deflector opening degree command value in the integral control element. That is, in the case of the power generation apparatus driven by the Pelton turbine, the integral control element of the rotational speed controller 12 holds the deflector opening degree command value instead of the guide vane opening degree command value described above. In the control of the power generation apparatus driven by the Pelton turbine, the guide vane opening degree command value of the above-described embodiment is used as the deflector opening degree command value.

REFERENCE SIGNS LIST 1 generator or generator motor
2 motor
3 breaker
4 rotational speed detector of rotor
5 output signal of rotational speed detector
6 rotational speed signal (65 F output signal, target rotational speed signal) corresponding to frequency of commercial power system
7, 10, 14, 17, 22, 28, 36, 38 subtractor
8, 29, 49 gain multiplier
12 rotational speed controller
13 proportional control function
15 integral control function
16 output runaway prevention circuit (conventional output runaway prevention circuit)
18 imperfect differential control function
19 adder
20, 31, 48 minimum value selection function
21, 52 load limiter
23 amplifier
24 actuator
25, 37, 55 integrator
26 guide vane operation mechanism
30 upper limit limiting function (first upper limit limiting function)
32 lower limit limiting function of conventional output runaway prevention circuit
33, 34, 50, 51 maximum value selection function
35 AND
39 feedback signal generation function
40 no-load opening degree and start opening degree setting function
41, 44, 53 signal switch
43 load upper limit opening degree setting function
45 output runaway prevention circuit
46 upper limit limiting function (second upper limit limiting function)
47 multiplier
54 divider

The invention claimed is:

1. A method of controlling a pumped storage power generation apparatus, the method comprising:

controlling the pumped storage power generation apparatus to operate in a power generation operation or a pumping operation, wherein the pumped storage power generation apparatus comprises i) a turbine and ii) a generator, wherein the generator comprises a rotor, wherein the generator is synchronously connected to a utility grid, wherein the turbine is directly connected to the rotor of the generator, and wherein the turbine is configured to drive the rotor of the generator in the power generation operation and further configured to be driven by the rotor of the generator in the pumping operation;

calculating, using a rotational speed controller, a guide vane opening degree command based on a difference between i) a reference rotational speed corresponding to a utility grid frequency and ii) an actual rotational speed of the rotor of the generator, wherein the rotational speed controller includes a proportional control element, an integral control element, and a differential control element;

providing, to the turbine, the guide vane opening degree command to control a guide vane in the turbine; and performing speed control during the power generation operation based on the guide vane opening degree command provided to the turbine, wherein the integral control element of the rotational speed controller includes an anti-windup circuit and an integral control function, wherein the anti-windup circuit includes a first upper limit limiting function and a second upper limit limiting function, wherein an output value of the first upper limit limiting function is determined based on an output signal of a load limiter of the pumped storage power generation apparatus, wherein an output value of the second upper limit limiting function is determined based on the difference between i) the reference rotational speed corresponding to the utility grid frequency and ii) the actual rotational speed of the rotor of the generator, wherein the output value of the second upper limit limiting function varies within a predetermined range, wherein, when the actual rotational speed of the rotor of the generator exceeds the reference rotational speed corresponding to the utility grid frequency, an output of the guide vane opening degree command generated by an output value of the integral control function is restricted, wherein a difference between i) the output value of the integral control function and ii) an output value of the anti-windup circuit is fed back to an input of the integral control function so that the difference between i) the reference rotational speed corresponding to the utility grid frequency and ii) the actual rotational speed of the rotor of the generator is reduced based on the difference between i) the output value of the integral control function and ii) the output value of the anti-windup circuit to forcibly reduce the output value of the integral control function, and wherein the output value of the anti-windup circuit is determined by multiplying the output value of the first upper limit limiting function by the output value of the second upper limit limiting function.

2. The method according to claim 1, wherein the anti-windup circuit includes a lower value selection function, wherein a lower limit limiting value of the lower value selection function is determined based on the output signal of the load limiter, wherein the lower value selection function is configured to set a lower limit value of the output value of the integral control function to a value obtained by multiplying a no-load opening degree set according to a static head in the power generation operation by a limit value defined within a predetermined range, excessive closing of the guide vane opening degree is restricted during no-load operation in a state where a circuit breaker is disconnected at startup or upon occurrence of a load interruption, and wherein a difference between the lower limit value of the output value of the integral control function and the lower limit limiting value of the anti-windup circuit is further fed back to the input of the integral control function to reduce the difference between i) the reference rotational speed corresponding to the utility grid frequency and ii) the actual rotational speed of the rotor of the generator to forcibly increase the output value of the integral control function.

3. The method according to claim 2, wherein an output signal of the load limiter increases at a first rate prior to an inlet valve of the load limiter becomes half open until the guide vane opening degree reaches a start opening degree and while a parallel breaker signal of the load limiter is OFF, the output signal of the load limiter increases at a second rate after the guide vane opening degree has reached the start opening degree until the guide vane opening degree reaches a load upper limit opening degree and while the parallel breaker signal is ON, and the first rate is slower than the second rate to i) reduce a rotational speed fluctuation after a rated rotational speed is reached and ii) allow the parallel breaker signal to be ON when the inlet valve fully opens.

* * * * *